May 3, 1966   W. W. BOYNTON   3,248,924
SYSTEM FOR DYNAMIC LOADING
Filed Nov. 22, 1961   11 Sheets-Sheet 1
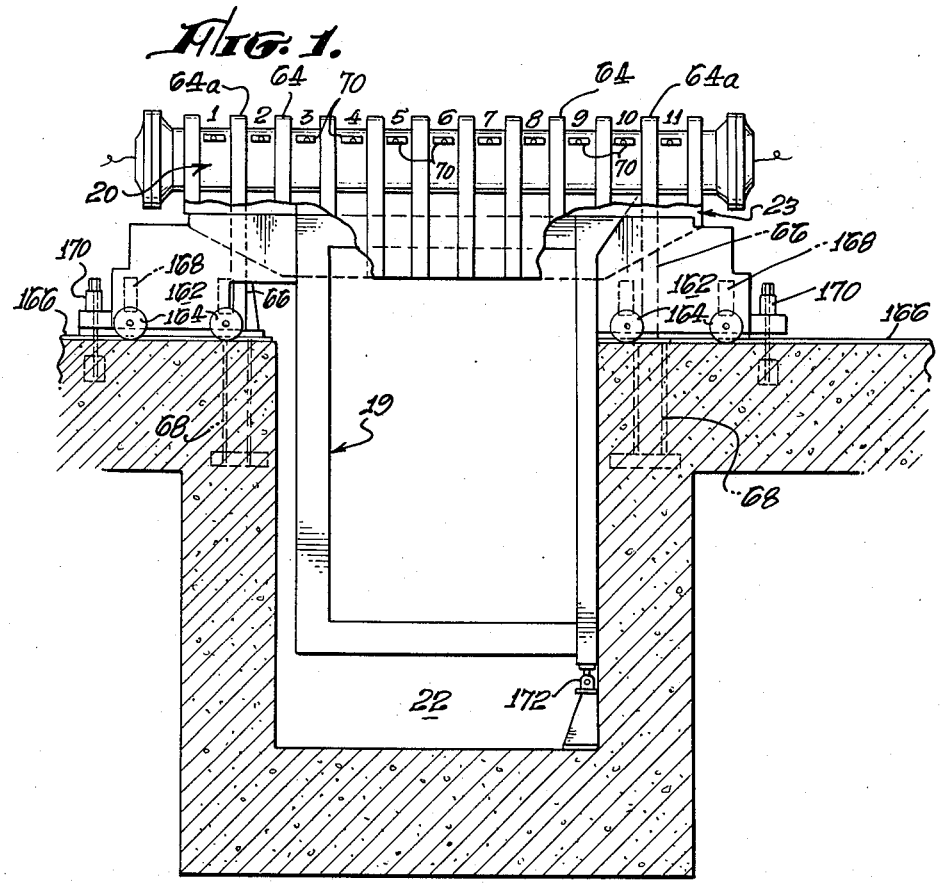
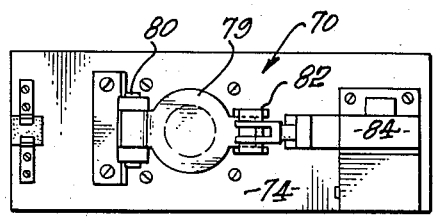
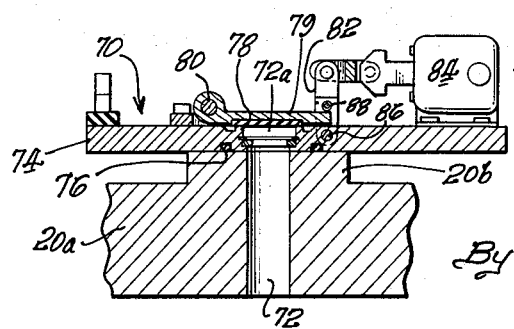
INVENTOR.
WILLIAM W. BOYNTON,
By Barkelew & Lewis

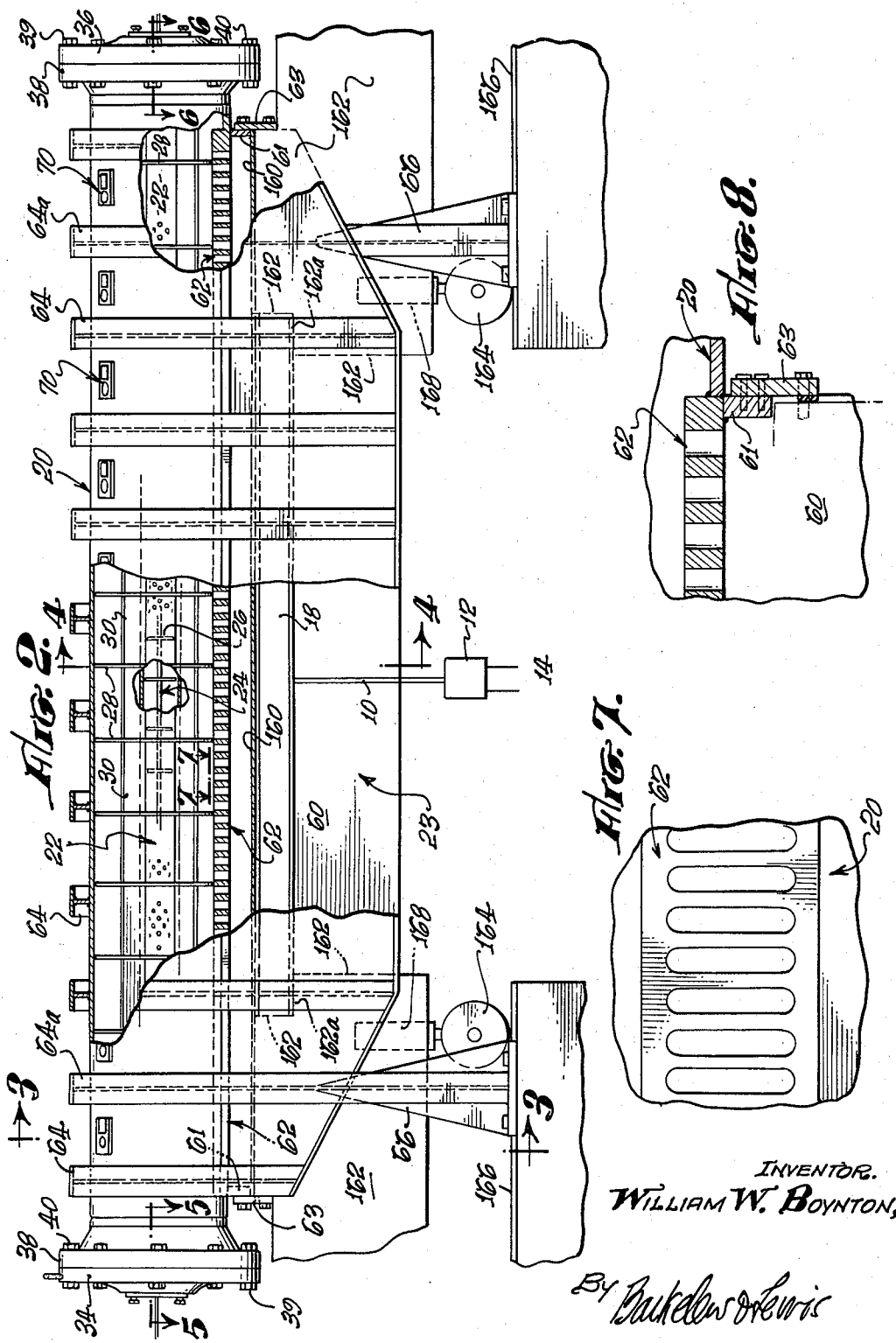

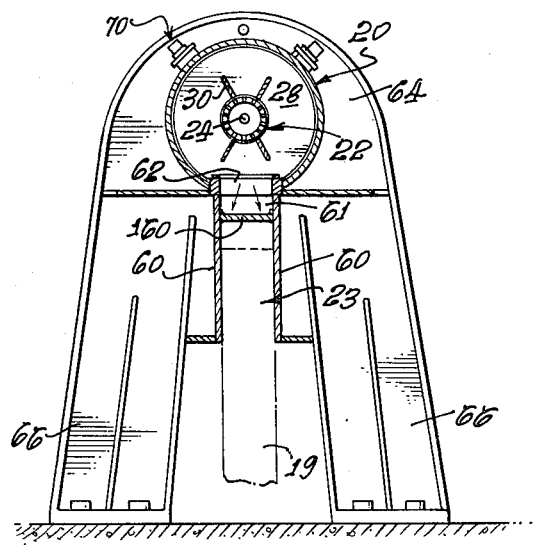
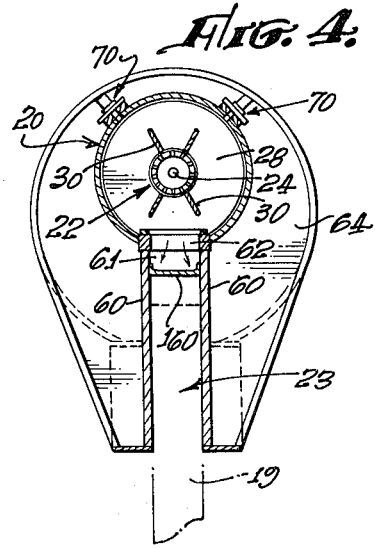
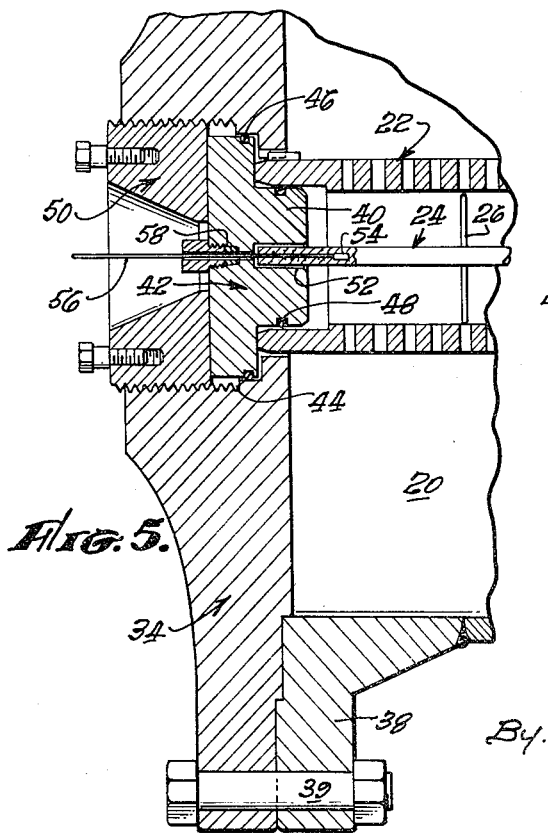
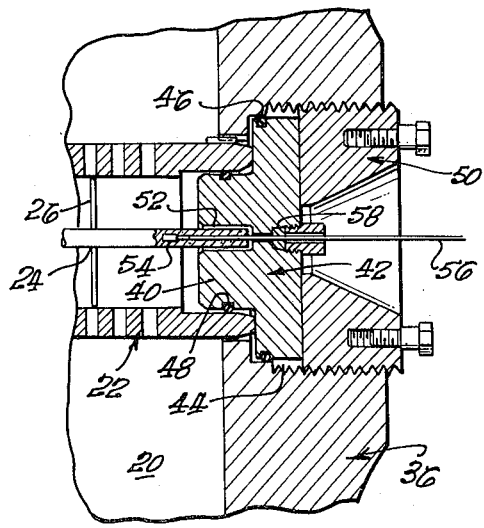
INVENTOR.
WILLIAM W. BOYNTON,
By Batchelor & Lewis

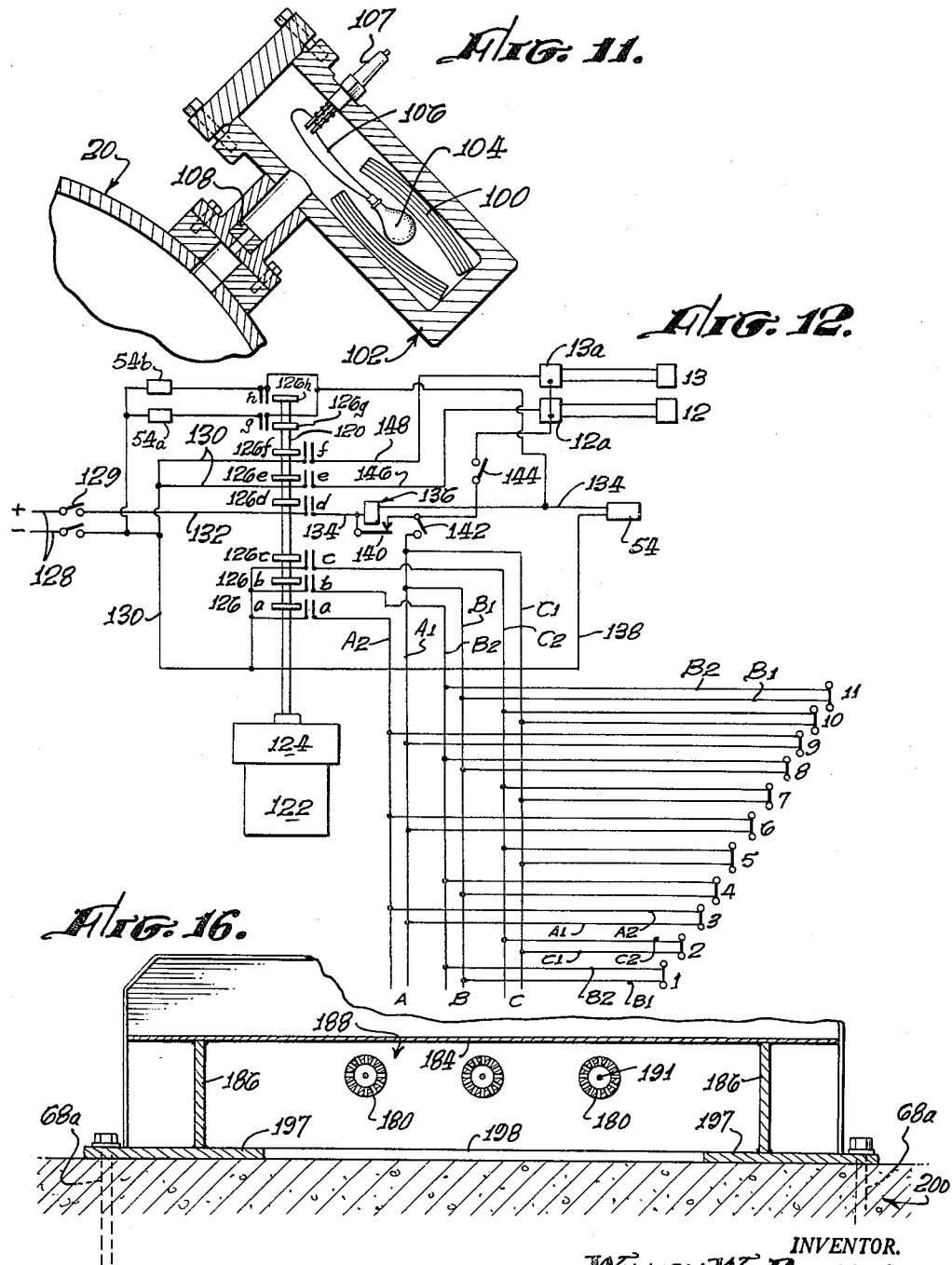

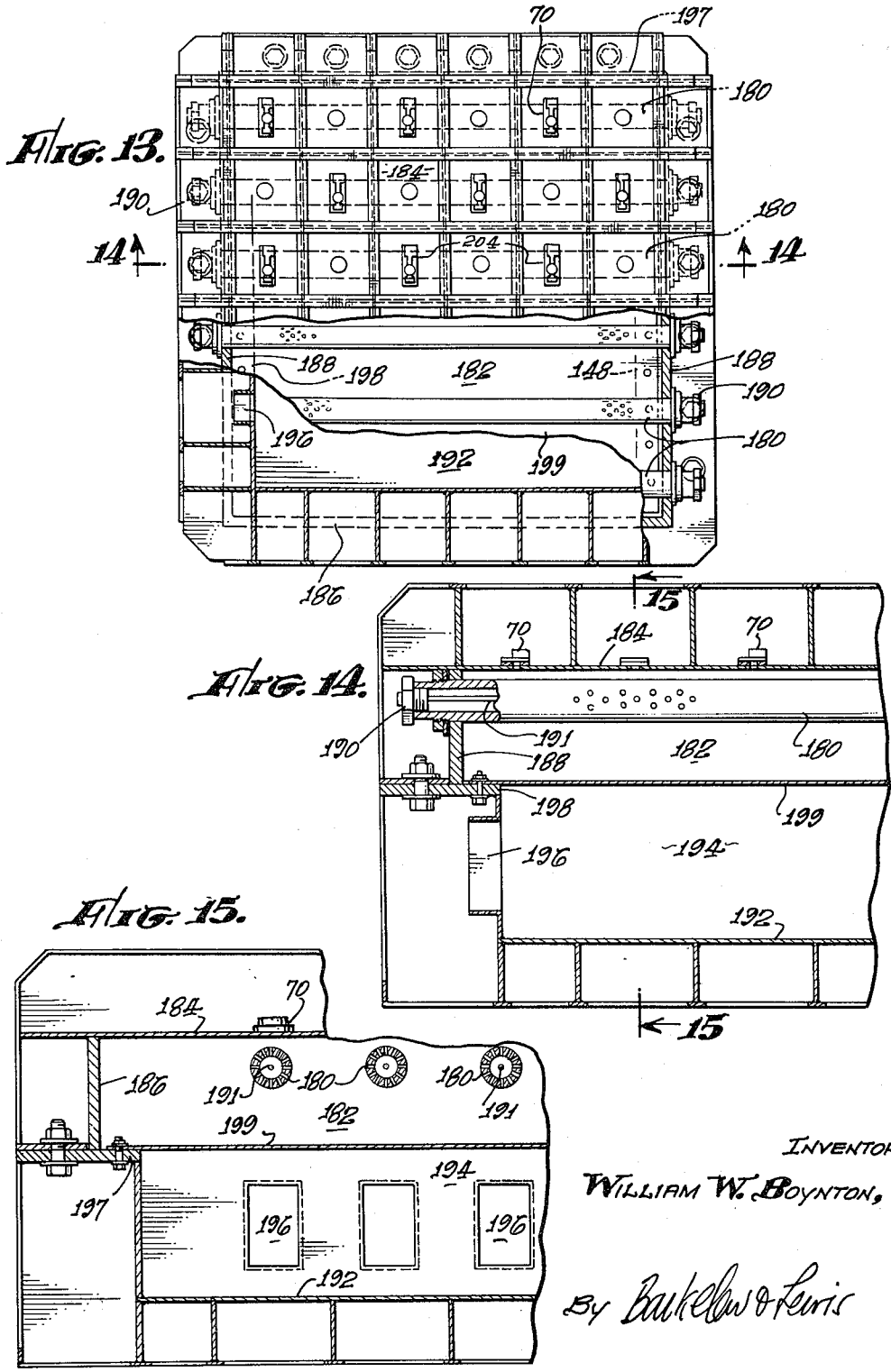

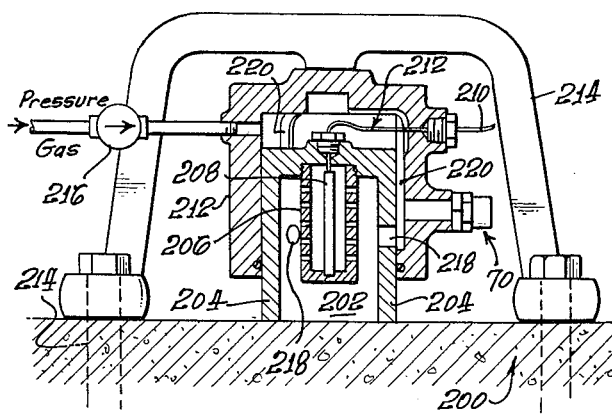
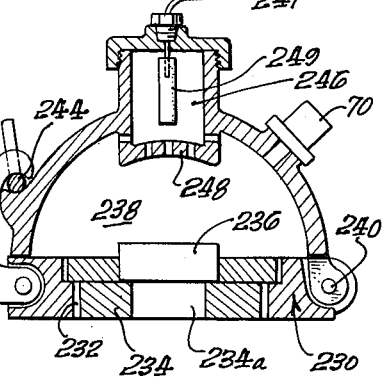
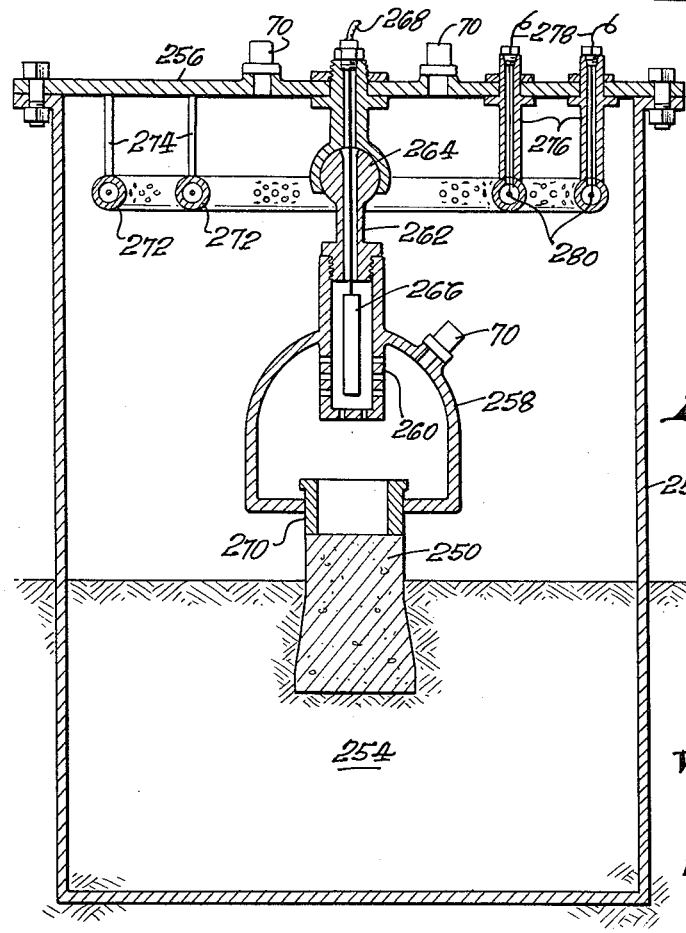

May 3, 1966 W. W. BOYNTON 3,248,924
SYSTEM FOR DYNAMIC LOADING
Filed Nov. 22, 1961 11 Sheets-Sheet 7
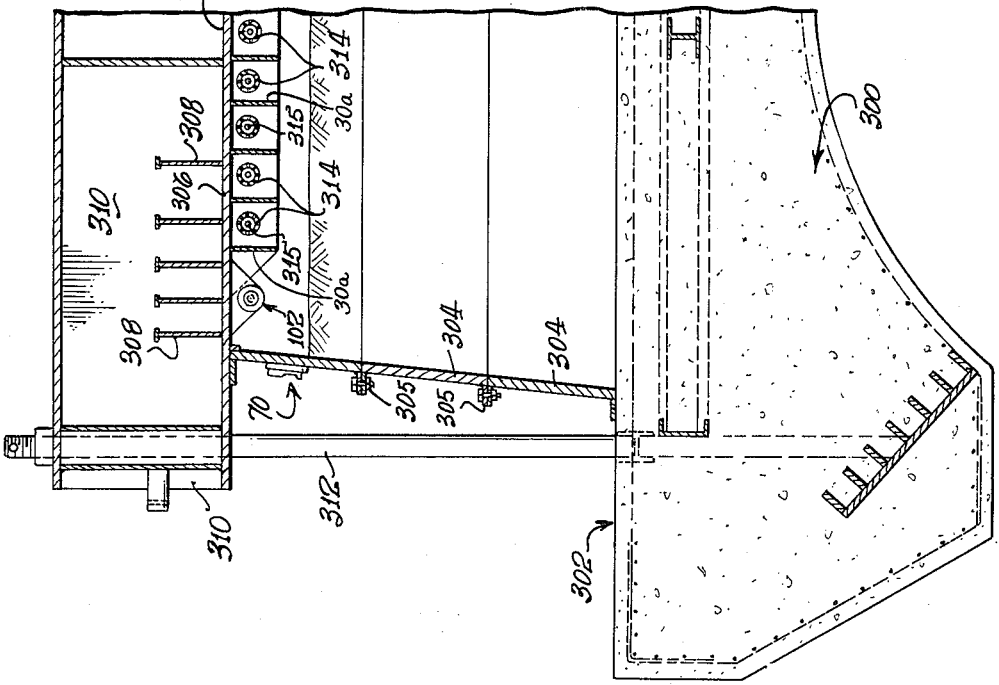
WILLIAM W. BOYNTON,
INVENTOR.
BY Backelew & Lewis

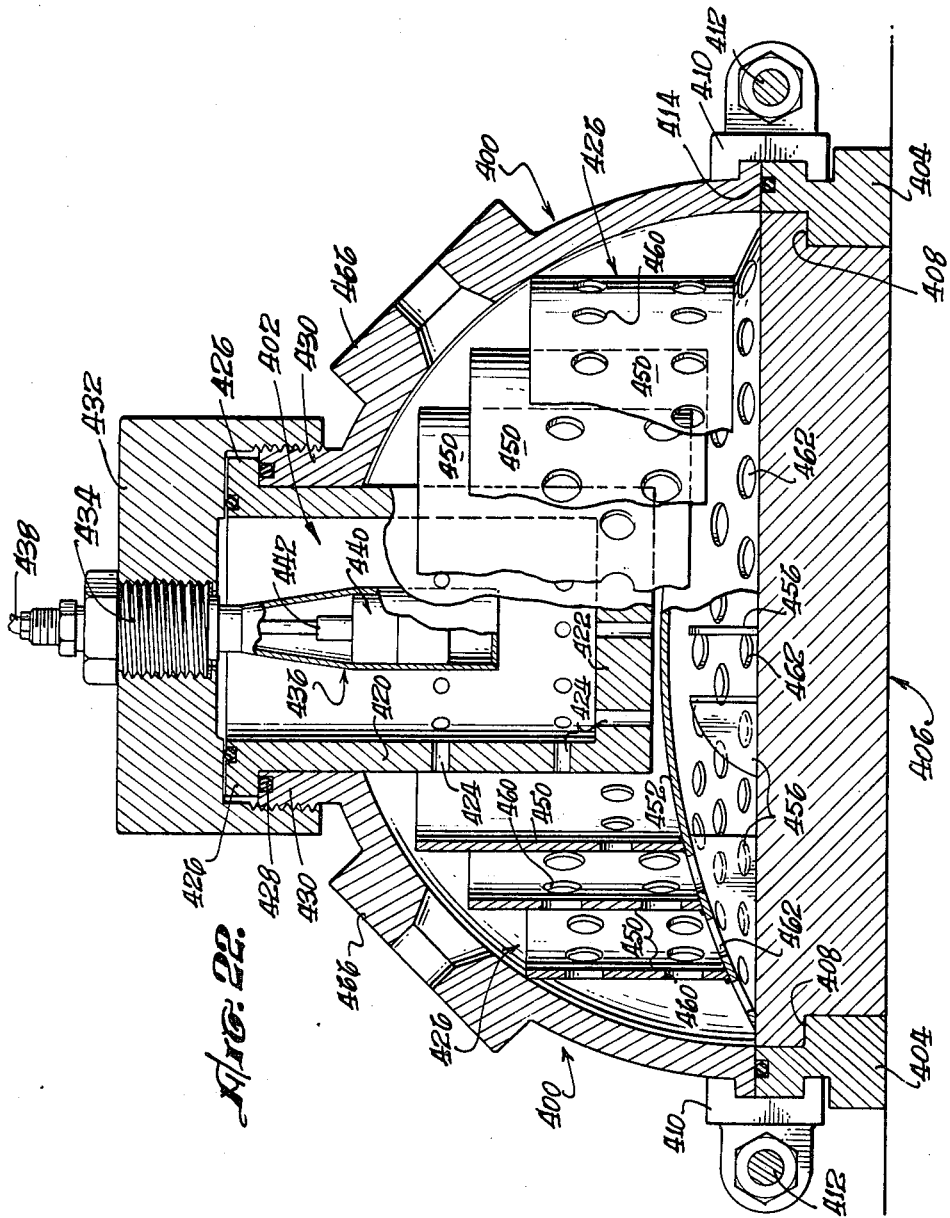

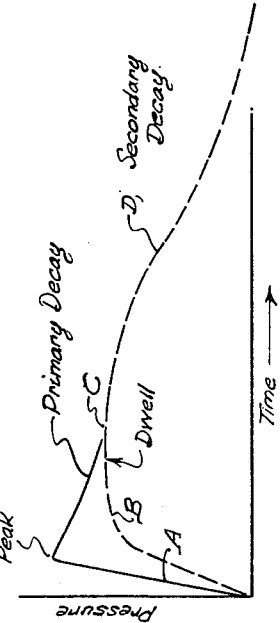
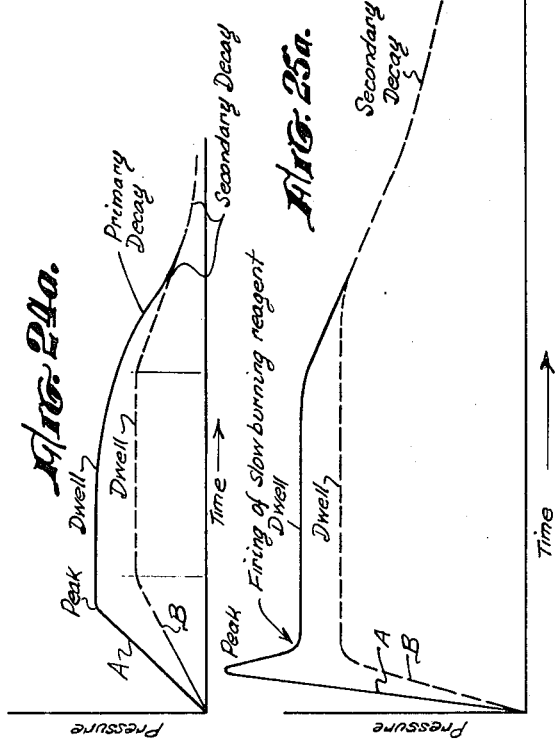
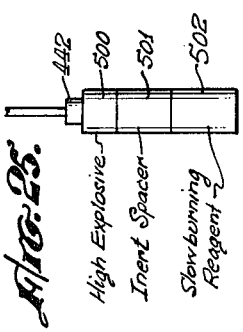

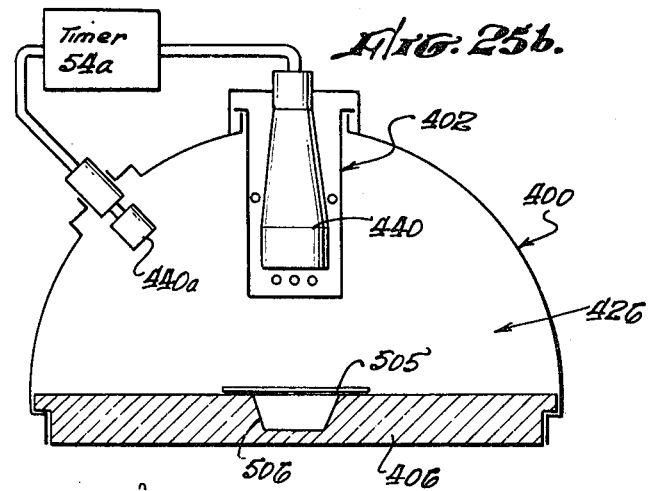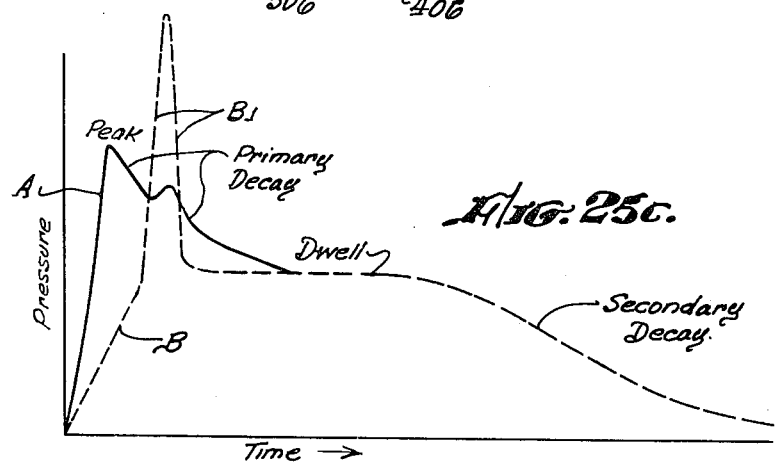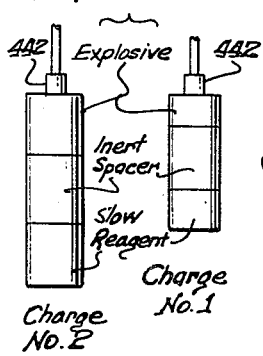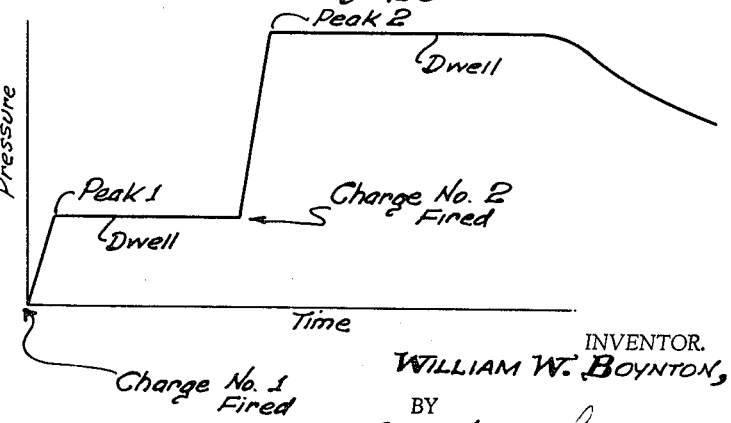

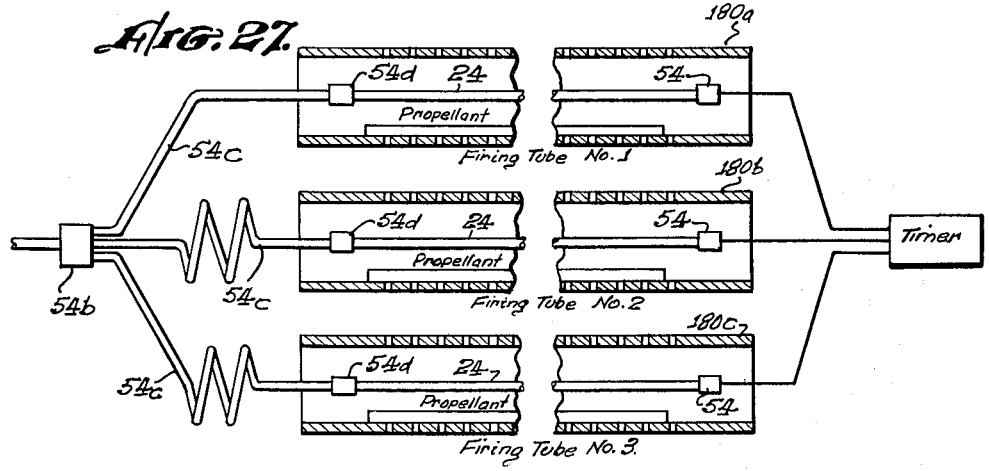
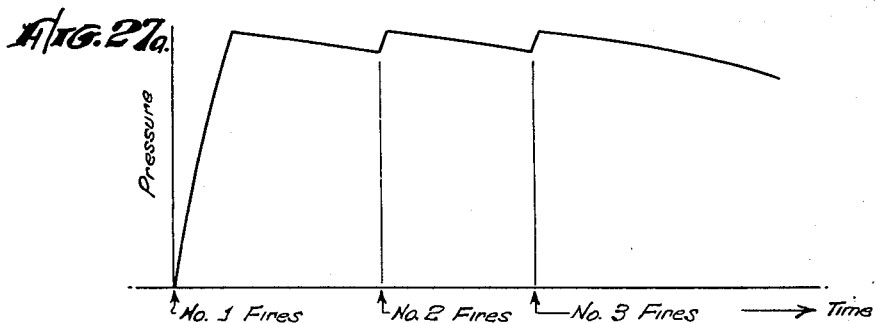
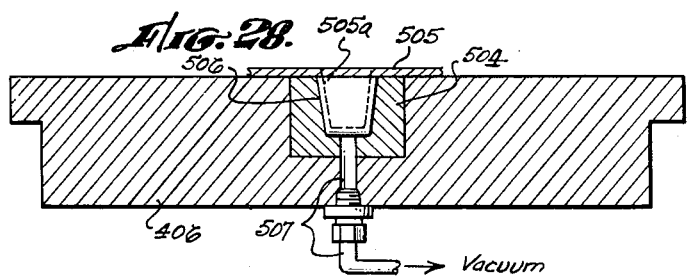
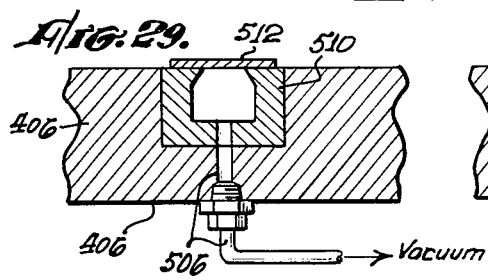
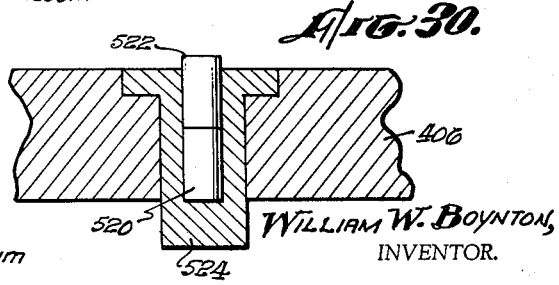

United States Patent Office 3,248,924
Patented May 3, 1966

3,248,924
SYSTEM FOR DYNAMIC LOADING
William W. Boynton, La Canada, Calif.
Filed Nov. 22, 1961, Ser. No. 155,533
32 Claims. (Cl. 73—12)

This application is a continuation in part of my application Ser. No. 819,983, filed June 12, 1959, System for Dynamic Loading, now abandoned.

The invention relates to the controller aplication of dynamic gaseous pressures to a subject or subjects for various purposes and with various results. For example, it may be used for test purposes, to ascertain the reaction of a subject to dynamic pressure loads simulating conditions similar to loadings characteristically created by nuclear explosions, or the subject reaction to dynamic pressure loadings of other characteristics. As other examples, it may be used to apply controlled pressures to subjects for compaction, modification of form, pressure welding, cutting and various similar operations. The general objective of the invention is the provision of a system, method of procedure, and apparatus, for such controlled dynamic pressure loading. The system of the invention is essentially inertia-free, involving only the inertia of the gases producing the dynamic load.

Generally described, the system involves, among other things, the initial generation of a gaseous body in a firing chamber at selected and controlled peak pressure and temperature within a controlled time period of pressure and temperature rise to the peak, followed by controlled primary pressure decay; and controlled rise of pressure in a load applying chamber to a controlled peak, controlled maintenance or dwell of that peak pressure for a selected time period, followed by a controlled pressure time sequence of decay of that secondary pressure. In some respects, the system may be called one of double decay.

The time period of initial presure rise, and the peak presure, in the firing chamber, are selectively controlled by the amount and type of reagents fired. And the pressure decay time, or pressure-time curve of decay, in the firing chamber is controlled mainly by the peak pressure and its controlled relief into the pressure-holding-and-load-applying chamber.

Initial pressure and temperature generation is typically had by firing one or more fast or slower explosive reagents, or relatively slow burning reagents such as e.g. black powder or propellants, or a combination of such chemically acting reagents, in the firing chamber; from which the hot pressure gases are allowed to flow, through controllably selected restrictions, into the pressure chamber where the pressure is applied to the subject. The peak pressure in that pressure chamber is selectively controlled, as are also the time period of rise to the peak and dwell at the peak and subsequent pressure decay.

The time of pressure rise, typically from one-half to many milliseconds, and the pressure peak and temperature in the pressure chamber, are controlled first by the relative size of that chamber, and then, with any given relative size, by the amount and type of reagents fired in the firing chamber, the time of primary pressure rise in that chamber, and by the selectively restricted orifice area through which the pressure gases flow into the pressure chamber. The peak duration or dwell in the pressure chamber is controlled primarily by the amount and type of the reagent or reagents and/or by the time of primary pressure rise and decay. The control of pressure decay in the pressure chamber, independently of initial pressure decay in the firing chamber, is first by heat loss from the gases in the pressure chamber and additionally by controlled pressure release or boosting to create any desired decay pattern.

As has been indicated, the initial pressure raising reagent may be selected for relatively very fast and/or powerful reaction; or, through various known compositions, down to relatively slow and/or low pressure raising power. For example PETN is very fast and powerful in detonation; dynamite and the new nitrate-oil explosive relatively considerably slower and raising lower peak pressures, and black powder or smokeless powder, or the compositions known as propellants, still much slower and/or less powerful. Black powder, for instance distributed in a relatively long string, burns quite slowly, with a relatively long period of pressure rise to a peak which may then be maintained by the latter part of the burning.

The invention contemplates the use of any such composition for initial pressure and heat generation. It also contemplates as will be pointed out hereinafter, the combined use of a relatively fast explosive igniting a slower reacting composition, for the purpose of quickly raising an initial high peak pressure followed by a controlled period of dwell at that peak, and/or a controlled relatively long period of initial pressure decay. It will be understood that where "explosive" is referred to in the following detailed descriptions, unless otherwise indicated, it is intended to include any such initial pressure raising composition, combination or admixture.

As for example, in simulating the loading characteristics of dynamic pressures exerted by a nuclear explosion, very high initial pressures may be raised by a fast and powerful explosive, and the peak pressures applied to a subject may be controllably varied from a slight over-pressure above atmosphere to many hundred pounds per square inch; the pressure rise time from less than one to many milliseconds; and the pressure decay time from a small fraction of a second to several seconds or more. In that simulation the invention provides, among other things, for pressure decay approaching that expressed by the formula:

$$P = Po(1-T/To)e/-T/To$$

where $P$ = pressure at any given time $(T-To)$
$Po$ = Peak over-pressure (typically pressure above atmospheric)
$T$ = time after peak pressure
$To$ = duration of decay time.

The above example of a pressure decay curve is only illustrative, and not limitative of the invention. Generally speaking, the invention is capable of reproducing any desired pressure-time curve, as well as any desired peak pressure, time of pressure rise, dwell at peak, and time and pressure-time curve of decay, or succeeding steps in the pressure rise and decay. It is characteristic of the invention that the controlled pressure build-up may be very fast, while the controlled pressure decay may be comparatively slow, under multiple controls, and along any desired pressure-time curve.

As a source of pressures, the system uses for example, an initial pressure generator that raises high initial pressure extremely quickly, e.g. an explosive. It has been found, among explosives in general, that the rate of detonation propagation is usually too fast, so that such rate cannot be depended on for setting or controlling the time of pressure rise. In this example a preferred explosive is one in which the propagation rate is extremely high, so that complete firing takes place in a time period at least comparable with, and preferably shorter than the shortest desired time of pressure rise; and the pressure rise time then set by controlled admission of the produced gases into a pressure and/or loading chamber. For example, a twenty-foot length of PETN Primacord. detonating at a propagation rate of 22,000 ft. sec., will completely detonate in less than a millisecond.

One form of apparatus illustrative of the invention comprises a heavy-walled firing tube in which a length of high-rate explosive, for example PETN Primacord, is mounted. The tube wall is selectively perforated to release the produced gases at the desired rate. A pressure chamber surrounds the firing tube and either itself forms a dynamic loading cell or is formed with an opening which may be applied to a subject or which leads to a cell in which the subject may be installed with provision to shut off pressure by-pass. Peak pressures, and the time period of pressure rise, are controlled by the amount or type of explosive used, and the area of perforations in the firing tube wall. Without further provision, the time of pressure decay from the peak is then controlled primarily by heat radiation and conduction from the hot detonation gases in the pressure chamber and the loading cell. For controlled faster decay of pressure, the wall of the pressure and/or loading chamber is provided with a number of controlled pressure reliefs, such as valves opened in selectively time sequence after the detonation. For longer periods of pressure decay, pressure gas may be fed in at regulated times and rates.

In the illustrative form just above described, the pressure chamber and loading cell are, in effect, a single chamber, divided structurally into two chambers. In other illustrative forms the pressure and loading chamber are structurally one, and in either case that chamber may take the subject simply by having an open side of the chamber held against it, or may take the subject entirely within the chamber. And the firing chamber is not necessarily enclosed within the pressure-loading chamber, but may be, as in some forms, simply in restricted communication with the latter.

The system is applicable for dynamic loading of any element of any kind, any given apparatus of the type where the subject is taken within the chamber being generally limited only by the size of subject the apparatus will take. The types wherein the open chamber is applied to the subject is particularly adapted for selective spot loadings on subjects of any size or location, such as large structures or structural elements; or are even adapted for creating dynamic loads in the earth. The following description, in dealing with dynamic loadings of typical structural elements is not intended as a limitation on the invention. And, where the system is used for testing, neither is there any limitation with regard to means for indicating, measuring and/or recording pressures, rise and decay times, or with regard to indicating, measuring and/or recording the behavior of the subject as regards its dynamic reaction to the dynamic pressures, e.g. its compression, flexure, vibration or failure. In general, any suitable or desired means or systems may be used for such indication, measuring and/or recording.

Typical apparatus and procedures, for testing typical structural elements such as beams and panels, and for performing various other operations illustrative of the invention, are now described, with reference to the accompanying drawings, in which:

FIG. 1 shows a side elevation of one form of test apparatus located over a pit accommodating the test piece, here illustratively shown as a rectangular frame;

FIG. 2 is an enlarged elevation and partial section of the apparatus of FIG. 1, showing a beam as test specimen;

FIGS. 3 and 4 are transverse sections on lines 3—3 and 4—4 of FIG. 2;

FIGS. 5 and 6 are enlarged detail sections on lines 5—5 and 6—6 of FIG. 2;

FIG. 7 is an enlarged fragmentary plan taken as indicated by line 7—7 on FIG. 2;

FIG. 8 is a detail enlargement of a part of FIG. 2;

FIGS. 9 and 10 are, respectively, a plan and longitudinal section of one of the valves controlling pressure relief from the pressure chamber;

FIG. 11 is a sectional view showing a preferred form of gas generator adapted to prolong the period of pressure decay;

FIG. 12 is a diagram showing the rudiments of a circuit and timing control means;

FIG. 13 is a plan, with parts in horizontal section, of another form of test apparatus designed for applying test pressures to such elements as panels;

FIG. 14 is an enlarged fragmentary section on line 14—14 of FIG. 13;

FIG. 15 is a fragmentary section on line 15—15 of FIG. 14;

FIG. 16 is a showing of other applications of the apparatus of FIGS. 13–15;

FIGS. 17 and 18 are showings of modified forms;

FIG. 19 is a section showing another modified form illustrating a multiple loading system;

FIGS. 20 and 21 are, respectively, half section and half plan of a further modified form;

FIG. 22 is a section with parts in elevation, of a further modification similar to that of FIG. 18;

FIGS. 23 to 26a are schematics illustrating various typical initial pressure raising reagents or compositions and typical pressure time curves for the firing and pressure chambers;

FIGS. 27 and 27a schematically illustrate timed successive firings of charges in firing chambers; and FIGS. 28 to 30 are schematics illustrating certain types of operations that may be performed by the system of the invention.

The illustrative form of apparatus and system shown in FIGS. 1 to 12 has been designed for loading such structural elements as beams, frames, etc. The illustrative subject piece 19 shown in FIG. 1 is in the form of a frame, known as a bent. To accommodate such a piece the apparatus is installed in and over a pit 22 whose heavy reinforced concrete walls and bottom form the reinforced concrete portion of the apparatus and the foundation.

The apparatus, as shown more particularly in FIGS. 2 and following, consists primarily of a cylindrical heavy walled closed pressure chamber 20, a longitudinal firing tube 22, with heavy perforated walls, and a loading cell 23 communicating with the pressure chamber 20 and adapted to take such structural elements as beams, frames, etc. A length of, e.g. PETN Primacord 24 is placed to extend through at least a part of the length of the firing tube, preferably supported centrally in that tube by spacers indicated at 26. Transverse baffles 28 as desired, and longitudinal baffles 30 as desired, preferably surround the firing tube 22 in chamber 20.

Cylindric pressure chamber 20 is closed at its ends by flanged end closures 34 and 36 secured to the flanged chamber ends 38 by suitable means such as the bolts 39, and the heavy walled firing tube 22 is mounted at its ends in those closures, as shown more particularly in FIGS. 5 and 6. As there shown in example the ends of tube 22 are seated around circular bosses 40 on removable plugs 42 which close central openings 44 in the closures 34 and 36. Suitable packing strips 46 seal the openings around the plugs, and others 48 seal the tube 22 around bosses 40. Screw threaded followers 50 hold the plugs in place. The ends of the firing cord 24 are mounted in central bores 52 in plugs 42, and electric firing caps 54 are placed in firing relation to the cord ends. The firing wires 56 for the caps extend out through packing glands 58. The firing cord may be simultaneously fired at both ends, or only at one. Firing tube 22 is bodily removable from the pressure holding chamber 20 by, for example, removing members 40 and 42, when the tube may be moved out through an opening 44. Also in e.g. FIG. 22 (later described) firing tube 420 may be removed from its pressure chamber 400, 406, by removing member 432.

The temperature and pressures initially raised in firing tube 22 are quite high; typically temperatures of about 6000° F. and pressures of about 5000 to 8000 p.s.i. The firing tube and its end closures are designed to safely withstand such temperatures and pressures. For example tube 22, in one typical design, is about eighteen feet long, six inches external diameter with walls three-quarters inch thick; the tube walls and end plugs 42 being of heat resistant metal. The internal diameter of pressure chamber 20 is about two feet, with walls heavy enough to safely take the maximum pressures to which it is subjected.

At its bottom the pressure chamber communicates with an open-ended loading cell 23 formed between two heavy plates 60 welded to the chamber walls and spaced widely enough to take subjects of the maximum width desired. Communication of the pressure chamber with this loading cell is through a heavy and transversely slotted bottom plate 62 welded into the pressure chamber wall. As shown in FIG. 2, this bottom plate and the loading cell extend through substantially the whole length of chamber 20. Under the ends of bottom plate 62, heavy transverse plates 61 (see FIG. 8) are welded in place between the side plates 60 of the loading cell; and other heavy end plates 63 may be bolted, in vertically adjustable positions, to 61 and side plates 60.

The pressure chamber and the loading cell are externally reinforced by horse-shoe shaped, flanged, reinforcing plates 64, welded to the chamber wall and plates 60. Two of these reinforcements 64a are extended downwardly to form the supporting legs and feet 66 which are tied to the heavy concrete walls of pit 22, as indicated schematically at 68 in FIG. 1.

A plurality of relief valve units 70 is installed on the upper wall of the pressure chamber. As here shown they are installed in pairs in the spaces between the horseshoes 64. A preferred type of valve is shown in FIGS. 9 and 10. At each relief valve the chamber wall 20a has an upstanding rim 20b surrounding the relief passage 72 leading from the interior. A valve plate 74 is secured in any suitable manner to the chamber wall over passage 72, with suitable sealing ring at 76 on rim 20b. A valve seat is formed at 78 around the passage 72a, and a flap valve 79, pivoted at 80, seats on that seat; the valve opening by swinging outwardly under the internal gas pressure in the chamber. The valve, when set, is held closed by the trigger 82 operated, to release the valve, by solenoid 84. As here shown trigger 82 is pivoted at 86 and carries a roller 88 that overlies the end of 79 to hold it down. Solenoid 84, when energized, pulls the trigger to the right in FIG. 10, freeing the valve closure to open. The valve, as here illustratively shown, is opened by the pressure in the chamber; it may however be opened by other means, such for instance as having a spring loading.

FIG. 11 shows a gas generator, one or more of which may be used in timed sequence to inject hot pressure gas into the pressure chamber to prolong the time period or otherwise shape the pressure-time curve of pressure decay. As there shown, a charge 100 of some quick burning material such as nitro-cellulose film is enclosed within a chamber 102 and is ignited by an igniter 104 that is ignited through a spark plug 107. Igniter 104 may comprise mixed black powder and magnesium powder in a bag of e.g. polyethylene sheet, containing also an ignition squib that is set off by the high tension current fed to it through wires 106 from spark plug 107. Casing 102 is pressure-tight and contains the air for combustion of the film. The hot pressure gases flow from the casing through calibrated nozzle orifice 108 into the interior of pressure chamber 20. The pressure generated in 102 is controllable by the size of the charge 100, and the time period of pressure flow into 20 controlled by the size of orifice 108.

FIG. 12 illustrates diagrammatically the rudiments of an electrical control system, for firing the charge or charges in the firing tube, opening the several relief valves in the desired timed sequence, and firing the pressure boosters of FIG. 11, in the desired sequence.

A cam shaft 120 is driven by motor 122 through a gear box 124 or other speed controller that can be set to drive the shaft at several different speeds between, say, six and sixty r.p.m. The shaft carries the requisite number of cams, here indicated as 126a to 126f, each adjustably settable on the shaft and each adapted to close a corresponding switch, indicated as a to f, in chosen sequence once per shaft revolution. One side of each switch except d is shown as connected to the minus side of feed circuit 126 by conductors 130. A switch 129 controls that feed circuit. To one side of switch d a conductor 132 goes from the positive side of 128. The other side of switch d is connected by conductor 134, through the winding of a locking relay 136, to the firing cap or caps 54 of the main charge or charges in the firing tube 22, the other side of which is connected via 138 with the negative side of the feed circuit. Relay switch 140 connects 134, via a switch 142, with lines $A_1$, $B_1$ and $C_1$ going to one side of the pairs of solenoid released valves 70 (the solenoid valves shown in FIGS. 9 and 10). These pairs of valves are indicated in FIGS. 1 and 12 by the numerals 1 to 11. $A_1$, $B_1$ and $C_1$ go to groups of these valves, as indicated. From other sides of the valve pairs conductors $A_2$, $B_2$, and $C_2$ go to the other sides of cam-operated switches a, b and c. Relay switch 140 also connects 134, via switch 144, to one side of high tension transformers 12a and 13a which feed the boosters of FIG. 11, numbered 12 and 13 in FIG. 12. The other sides of the transformers are connected via 146 and 148 with the other sides of cam operated switches e and f.

In operation, after motor 122 is turning the cam shaft over at the selected speed, switch 129 is closed. Then, when switch d is closed by cam 126d the detonation cap or caps 54 are fired and simultaneously relay 136 closes one side of the circuit or circuits to the valve circuits A, B and C, and/or the circuit to the booster transformers 12a and 13a. The other sides of those circuits are then closed in selected sequence by their cam operated switches a, b, c and e, f. For example, if the pressure decay period is desired to be shorter than that set by heat loss from the pressure chamber, switch 144 can be opened, or the boosters not charged, and switch 142 closed. With cams 126a b and c set to close their switches in the desired time sequences after firing switch d closes, the relief valves of the A group (here shown as 3, 6 and 9) then those of the B group (1, 4, 8 and 11), and then those of the C group (2, 5, 6 and 10), will be released to open in the desired time sequence after the main charge is fired. If, on the other hand, a higher pressure step is required, or a pressure decay period is desired longer than that caused by heat loss, switch 142 may be opened and switch 144 closed, and cams such as 126e and f set to fire any desired number of pressure boosters in any desired time sequences.

As indicated initially, the applied loading pressures may be controllably varied, and their pressure-time curve shaped, through a wide range, and that is also true of the time periods of pressure build-up and decay. The pressure-time function may involve a series of steps, straight lines or curved lines, or a combination of two or more of such. The initial firing pressures in the firing tube are, typically, very high; for example, several thousand p.s.i. By using different weights of high explosive, together with various weights of other explosives, varying peak pressures, pressure-time curves, and time durations are in practice produced in the pressure chamber; from as low as, say, a slight over-pressure to many hundred or thousand p.s.i. The time period of pressure rise in the pressure chamber then depends primarily on (1) the selective total perforation area of the wall of the firing tube, and (2) the selective weight and makeup of the explosive charge. For apparatus of the size here indicated, the tube may typically have approximately three thousand evenly spaced quarter-inch perforations. A lesser or greater total perforation area, combined with different charge make ups, gives period of pressure build-up in the pressure chamber controllably variable from less than one to many milliseconds.

Many other variations may be made in the method of operation to obtain various effects. For example, the pressure rise to peak may be stepped, or two or more successive peaks may be produced, by firing successive charges in chosen time relation. For instance, the firing tube may carry two separate charges, as would be the case if the charge cord shown in the figures were medially divided into two charges, each fired at their outer ends. By then providing two adjustable charge firing cams 126d, each with a charge firing circuit like that shown in FIG. 12, the two charges can be fired in any desired time sequence. This is more fully explained in connection with FIG. 19.

Furthermore, the pressure relief valves and/or the pressure boosters may be actuated in any desired timed relation to the firing of the charge or charges, or to the pressure dwell hereinafter explained. The boosters may be fired at such relative times as to raise the peak pressures; fired even before the firing of a main charge. Or fired at such relative times as to prolong a smoothly dropping presure decay, or to effect a pressure decay in steps. And the relief valves may be opened in any timed relation to the initial firing or pressure dwell and to the firing of the boosters. The valves, or some of them may be opened even before the main firing; or, for example, a relief valve or set of valves may be opened to drop the pressure after one main firing, followed by another main firing or booster firing, and so on for as many pressure decays and rises as desired.

The control system, including the pressure decay controls, such as here illustratively shown and described, may be used for controlled operation of any of the system and apparatus forms herein described.

FIG. 1 shows a frame or bent 19 in the loading chamber between the side plates 60; FIG. 2 shows a beam 18 in loading position. The loading chamber is sealed at the upper face of the subject by a flexible sealing strip 160 such as shown in FIGS. 2, 3, and 4. For example, as shown in FIG. 2, this sealing strip may overlie the beam 18 and the filler blocks 162 mounted on cart wheels 164 running on tracks 166. In the aspect of FIGS. 3 and 4 the sealing strip may overlie filler plates that may be used to fill spaces between cell plates 60 and any narrower subject specimen. The cart blocks support the beam ends and the sealing strip in such a position as shown in FIG. 2 with the sealing strip ends pressed up against cross-plates 61 inside plates 63. The blocks fill the chamber ends between plates 60 beyond the ends of the subject specimen. The carts have suitable hydraulic lifts, indicated diagrammatically at 168, to raise their blocks and the subject specimen and seal. They are also provided with suitable tie-downs, indicated diagrammatically at 170 in FIG. 1. A subject such as the frame 19 shown in FIG. 1 is blocked endwise in the loading chamber by the cart blocks, the sealing strip is supported by the frame and blocks, and the frame supported from below, as indicated at 172. If the width dimension of the subject specimen is less than the width of the loading chamber between its side plates 60, the excess space may be filled with filler shim plates supported, for example in FIG. 2, on the cart shoulders 162a that support beam 18.

The reaction of the subject specimen to the dynamic pressure may be one of temporary or permanent flexure, vibration, or failure. Those reactions may be indicated, measured and/or recorded by known means and/or systems applied to the test specimen. As a simple example, FIG. 2 schematically shows a feeler rod 10 supported against beam 18 from an element 12 that may include e.g. a compressively variable resistance or a variable capacitance. From that element wires 14 may lead to circuiting systems involving amplifiers, indicators, oscillo- graphs and/or recording films or tapes, etc. to indicate and/or record the reactions of the specimen. The various gas pressures, temperatures, and time periods, the rates of pressure rise and decay, may be indicated and/or recorded by known systems, involving such elements as temperature and pressure responsive elements, oscilloscopes, recorders, etc.

FIGS. 13 to 15 show a modified form of apparatus designed for loading such elements as panels, etc. Here a number of perforated firing tubes 180 are installed across the upper part of a broad pressure and loading chamber 182 that is enclosed on top by the exteriorly reinforced plate 184, at the sides by plates 186 and at the ends by plates 188. The tubes extend their ends outside end plates 188 and are there provided with suitable fittings 190 to carry the ends of the firing cords 191 and to seal the entering firing wires. The explosive charges in the several tubes may be fired simultaneously or successively. The structure provides a reinforced floor 192 below a chamber 194 open, at 196 at its ends, to atmosphere.

The structure also provides, at the bottoms of the side and end plates 186 and 188 of pressure chamber 182, shoulders 197 and 198. A panel may be mounted directly on those shoulders, as indicated at 199, or it may be supported on a panelled frame mounted on those shoulders, or supported on suitable supports from the floor 192 and blocked around within the shoulders 197, 198 to seal off pressure by-pass around it. Pressure and loading chamber 182 is provided at its upper wall 184 with a plurality of spaced relief valves 70 like those shown in FIGS. 9 and 10. The detonation charges 191 and the relief valves 204 may be controllably actuated in the manners before described; the peak pressures, times of pressure rise and decay being selectively controlled as described; and the indicating and/or recording of the temperatures and pressures, and specimen reactions as before generally indicated. One or more pressure boosters, such as shown in FIG. 11, may also be applied to pressure chamber 182 and controllably actuated as before described.

The types of apparatus and systems above described, in any suitable size, may be used for applying either overall or spot shock pressures or controlled dynamic loads to virtually any subject element or specimen. For example, FIG. 16 diagrammatically shows the application of the form of FIGS. 13–15 to an element 200 which may represent any subject specimen to or over which the apparatus may be anchored or tied. Element 200 may, for example, represent a structural member, or it may represent the ground. Anchoring or tying means are indicated at 68a. As applied to the ground, the system may be utilized for setting up shock waves or dynamic loadings for subterranean exploration, for example. As applied to structural elements, it may be used for setting up shock waves or dynamic loadings travelling from the spot to which the loadings are applied; and investigation of the speed pattern of the wave travel may then locate areas of weakness or incipient failure in the specimen.

In the form of apparatus shown in FIGS. 13–15 and 16, it will be noted that the pressure-loading chamber is laterally walled all round (by end and side plates 186, 188) and open only at the bottom where it takes the subject specimen. The same is true of the modified forms shown in FIGS. 17 and 18.

FIG. 17 shows diagrammatically another form of apparatus that may be used for spot loading on any desired element, here again represented by 200. A cylindric pressure chamber 202 with heavy walls 204 is open at its bottom. A perforated firing tube 206 is mounted in the chamber and carries the explosive charge 208 fired as before described via wires 210. Chamber 202 is movable, like a piston, in an open-ended cylinder 212 closed at its top and anchored to the test specimen 200 by such a means as is diagrammatically shown at 214, or held in the illustrated relation to the subject 200 by any suitable means. The open lower end of 202 is pre-loaded on the subject by pressure gas fed in through a check valve 216. Wall 204 of the pressure chamber has a port or ports 218 which discharge into grooved passages 220 in the wall of cylinder 212, those passages leading to the upper end of the cylinder. Relief valves 70, in any desired number, like those before described, control pressure relief from 212; those valves and the charge firing may be actuated in timed relation as before described, and the booster, or boosters, of FIG. 11 may also be applied to cylinder 212 and controlled as before described.

In operation, the device is anchored or tied to the subject specimen, whatever it may be, and pressure gas fed in at 216 to pre-load the open end of pressure chamber 202 on the specimen. On firing the charge, the dynamic pressure in 202 rises, under control, as before described, as to peak pressure and time and characteristics of pressure rise. At the same time that pressure is exerted on the subject specimen over the area determined by the inside diameter of 202, it is also exerted on the larger area of the top of 202, the pressure gases reaching the upper end of cylinder 212 via the passages 220. The excess pressure on the top of 202 holds it tightly against the specimen. After the predetermined peak pressure is reached, or in any desired time relation to that, the relief valves 70, or the booster or boosters of FIG. 11, control the pressure decay as before described.

FIG. 18 shows another form, designed particularly for applying dynamic pressure to small specimens. A base, 230, which may be circular or of other shape in plan, has a recess 232 to take mandrels 234 suitably shaped to carry the subject specimens, such as shown at 236. The mandrel may have an opening 234a to atmosphere under the specimen. Walled pressure chamber 238, open at the bottom, is adapted to have its lower wall edge pressed tightly against base 230. It may be hinged at one side, as at 240, or it may be held down all around by such latches as shown at 242 equipped with eccentrics 244 for forcing the chamber down. The chamber 238 has one or more relief valves 70 as before described, and may also have one of more boosters (FIG. 11); both controlled and operating as before described.

The firing chamber 246 is shown as formed integrally with chamber 238 and communicates with the latter through perforations such as shown at 248. The firing charge 249 is suspended in 246 and fired via wires 247. Control and timing of peak pressures, and pressure decay may be as before described.

The forms of apparatus shown in FIGS. 16–18, with their peripherally closed and open mouthed chambers, lend themselves most readily to test procedures such as the following.

A small scale model of a full sized subject may be subjected to over-all dynamic pressure as before described, with provisions for measuring displacements and displacement pressures at various locations, under the dynamic load. The points of maximum energy flux, as indicated by those measurements, are the spots of maximum energy flow to spots of potential weakness in the structure. Having ascertained the location of those spots of high energy flux, spot loading may be applied to those sites in the full scale structure; and the observed and measured reactions of those various spots will, in sum, simulate the effect of an over-all application of dynamic pressure to the whole structure.

FIG. 19 shows an illustrative form of apparatus for applying correlated multiple dynamic loadings to plural subjects, here shown illustratively, as footings and surrounding soil. In that figure a section of subject footing is shown at 250 enclosed in a casing 252 which also encloses a volume of soil 254 under and surrounding the section of footing. Casing 252 may be closed at its top by a cover 256 which may carry the pressure producing and applying systems.

As here illustratively shown, a pressure chamber 258 with a perforated firing chamber 260 is carried by a member 262 that is hung by ball and socket joint 264 from cover 256. The firing charge 266 with its firing cap may be suspended in 260 by its firing wires 268 extending down through 264 and 262. Pressure chamber 258 carries in its bottom wall a sliding tubular piston 270, preferably square or rectangular in plan, and of a size relative to the footing as shown in the figure. Pressure chamber 258 may have one or more relief valves 70 and also one or more of the boosters of FIG. 11 is desired. On firing charge 266 pressure in 258 on the upper end of piston 270 presses it tightly against the footing; and the pressure is applied to the footing through 270.

One or more annular perforated firing tubes 272 are mounted in casing 252, shown here illustratively as suspended at 274 from cover 256. One of the suspensions for each firing tube may be in the form of a hollow tube, as illustratively shown at 276, and the firing wires 278 for the charges 280 in the firing tubes may extend through those suspensions. The large chamber formed by 252, 256 may have one or more relief valves 70, and also one or more of the boosters.

Firing of charge 266 applies a dynamic pressure to footing 250; while simultaneous or sequential firing of charges 280 applies dynamic pressure to soil 254 surrounding and under the footing. Typically, a peak pressure, of say, 750 p.s.i., may be applied to the footing, and a peak pressure of, say 100 p.s.i., to the soil.

Charges 266 and 280 may be fired simultaneously or in any desired timed sequence, and the relief valves and/or boosters actuated in any desired timed sequence, by such a control system as described in connection with FIG. 12. The peak pressures, times of pressure rise and decays, and the pressure-time curves may be controlled as before described, and pressure dwells as described hereinafter. The results of the tests, as to such matters as footing displacements or failure or soil displacement, may be measured, indicated and/or recorded by any suitable known means; as may also the peak pressures, time periods and pressure-time curves.

For controllably operating such a multiple loading system as shown in FIG. 19 (or any of the other systems described here as having multiple explosive charges) the control system of FIG. 12 may have additional cam operated switches such as shown at $g$ and $h$ actuated by adjustable cams 126$g$ and 126$h$. Such additional switches, connected for instance to line 134 and to the minus side of feed 128 through additional firing charges 54a and 54b, can be used for firing these additional charges either simultaneously with, or in any desired time sequences with, charge 54. Thus, in FIG. 19, the charges 266 and the multiple charges 280 may be fired in any desired time relation. Dynamic pressures may thus be applied to 250 and 254 simultaneously, or in controlled sequence, and the multiple charges 280 may be fired together or in controlled sequence.

The control system such as shown in FIG. 12 may also be used for firing any multiple number of charges in any desired controlled time relation; for instance, for firing much multiple charges as are shown in FIGS. 13 to 16 and 20, 21. And also for firing multiple charges in the form of FIG. 2, where, as has been mentioned, the charge may be divided into two and fired from each end of the firing tube.

FIGS. 20 and 21 show another design of apparatus adapted more particularly for shock wave or dynamic loading of large subjects. A heavy reinforced concrete dome 300 with a flat top surface 302 forming a base and bottom closure, is constructed preferably in the ground with upper surface 302 at about ground level. A large and heavy, reinforced, pressure chamber is adapted to be placed on and attached to the base. As here illustratively shown the circular pressure chamber has a heavy peripheral wall made up of sections 304, the height of the chamber depending on the number of those wall sections, which may be bolted together, as at 305. The chamber is closed at its top by the heavy top wall 306, reinforced as at 308, 310, and bolted or otherwise secured to top section 304. As shown in FIG. 21 the heavy reinforcements 310 extend radially, and the heavy tie-down nuts and bolts 312, that tie the whole pressure chamber together by connection to base 300, connect to those radial reinforcements 310 where they overhang wall 304.

A plurality of perforated firing tubes 314, with firing charges 315, is mounted under upper wall 306. Pluralities of relief valves 70 and pressure boosters 102 (FIG. 11) may be provided. The charges in the several firing tubes, the relief valves and/or the pressure boosters, may all be controllably actuated in any desired time relation, and the peak pressures, time of pressure rise and decay, may be controlled as before described. Baffles, such as shown at 30a, are located alongside and between the several firing tubes to control reverberations.

As stated, this type of test apparatus is designed particularly for applying dynamic shock pressures or loads to large and heavy subject specimens. In one typical design the pressure chamber is of the order of twenty-two feet in diameter. In use, it is proposed, for instance, that the subject specimen be placed on the flat-top dome 300 and the whole test chamber be then carried to and lowered over the specimen and down on the base by a gantry crane (not shown). Such a crane may travel on rails and span a line along which a plurality of such flat-top domes 300 are spacedly located, the crane applying the pressure chamber, or chambers, to any selected ones of the domes. Upon being lowered onto a base over the subject specimen, the chamber is then securely tied together by the heavy tie-down bolts.

Herein, where sequential multiple as distinguished from single firings are referred to, it is to be understood that partial or complete pressure decays may take place after each sequential pressure rise to and dwell at the controlled peak; that each of the several pressure-rise times and peak pressures may be controlled as has been described; and that each of the several ensuing pressure decays may be controllingly modified as described. Thus, for instance, a first firing may controllably result in a peak load pressure of some selected amount in a selected time of pressure rise. Then, in a selected decay period the controlled decay may bring the load pressure down in a selected decay pattern to, say, half the preceding peak when a second firing is had. The second firing may then raise a second peak pressure which is, say, higher than the first in a pressure rise time greater or less than the first. And then pressure decay from the second peak may be controlled to be of either the same or of an entirely different pattern, as compared with that of the first decay. In the control system of FIG. 12, some of the relief valves and/or some of the boosters, may be timed after each of the firings; this requiring only duplications of circulating shown in the figure, or merely proper sequential adjustment of the several actuating cams. As has been indicated, such successive firings, rises to peaks and decays, may be had with single or multiple firing chambers (e.g. FIG. 2 and 13) and with single or multiple pressure-and-loading chambers (e.g. FIGS. 2 and 19).

It is to be noted the dynamic pressure applications of the system are reproducible. For any given apparatus in a given environment the pressure decay due to heat loss is a reproducible constant. The peak pressures, pressure rise times, and the nature of the pressure-rise curve are reproducible. And the pressure dwell and decay controls and modifications being also reproducible; the whole operation of dynamic pressure loading is reproducible.

FIG. 22 shows a further modified form of apparatus, similar to that of FIG. 18 but with certain additional features. In this FIG. 22 the pressure chamber is enclosed by a dome-shaped cover 400 with its mounting for the firing chamber 402, and by a base ring 404 which holds a base platen 406 shoulder-seated at 408 on the base ring. Base ring and dome cover are held together by a spit clamping ring 410 secured by bolts 412. An O-ring at 414 insures a pressure tight joint between the cover and base ring. The shoulder seat at 408, preferably a flat ground fit, is held tight by the internal pressure exerted down on the platen 406. Platen 406 is here shown as forming the bottom wall of the pressure chamber enclosed by 400; but that bottom may be of any desired form, for instance it may include a downwardly extending container like that of 252 in FIG. 19, adapted to contain such subjects as soil, etc.

Firing chamber 402 is here formed as a separate piece with heavy cylindric and bottom walls 420 and 422, perforated at 424 to provide the selected total orifice area from the firing chamber interior to the interior pressure chamber 426 under the dome cover. Firing chamber 402 is itself open at the top and has an external seat flange 426 that seats on an O-ring 428 on the upper edge of a cylindric part 430 of the wall of dome 400. The firing chamber is held down and its upper end closed by the heavy cap 432 threaded onto 430. A pressure sealing element 434 extends through 432 and serves to suspend the firing cartridge 436 and to sealingly pass its firing cable 438. The pressure raising charge 440, fired e.g., by a primary firing cartridge 442, may be of any of the natures of types herein typified.

Apertured seats such as those shown at 466 accommodate the relief valves of FIGS. 9, 10 and/or the pressure boosters of FIG. 11, any number of which may be sequentially controlled as explained in connection with FIG. 12. And if plural charges are utilized in the firing chamber they may be sequentially fired as explained in connection with FIG. 12, or by the sequential firing control explained below. The openings in 466, if not used as above, are of course closed.

The pressure chamber as shown in this FIG. 22 is provided with a series of baffles surrounding the firing chamber. As shown illustratively here the baffle arrangement comprises three spaced concentric circular and perforated baffle walls 450 mounted on a base plate 452 of inverted dish form whose outer edge rests on platen 406. Between the baffle walls the baffle base plate is also perforated, as illustrated. And the outer circular zone of base plate 452 under baffle walls 450 is supported on radial support fins 456, arranged to leave a central zone on platen 406 inside the support fins for the subject to which the dynamic pressure wave is to be applied.

The total area of perforations 460 in each baffle wall 450 and, as shown here, of the open passages over the tops of 450, and also the total area of perforations 462 in baffle plate 452, are each much greater than the total area of the selectively restrictive orifices 424 through the wall of firing chamber 402. The function of the baffles is not to restrict the pressure wave flow from the firing chamber to the pressure chamber and the subject in it, but to minimize wave resonance in the pressure chamber, so that the pressure rise to the peak, the peak dwell, and subsequent pressure decay, are of smooth patterns devoid of reverberated waves. The baffles 30 of FIGS. 2 and 3, and the plate structure 30a forming the individual cells for the firing tubes 314 in FIG. 20, perform the same baffling of resonance. And any such baffling arrangement may be applied to any of the apparatus forms here described.

FIGS. 23 to 26a show schematically various typical types of initial pressure raising charges and typical corresponding controlled pressure-time curves obtainable with such charges. In the preceding specific descriptions of FIGS. 1 to 21 the charge in the firing chambers or tubes has been referred to as explosive. It will be understood that such term is intended to include not only high and fast explosives but also slow reacting ones such as e.g., black powder and the relatively slow burning reagents such as are known as propellants. Typical propellants are known as X–12 and nitrocellulose. The various typical initial pressure raising charges for the firing chamber shown in FIGS. 23 to 26 may be utilized in any of the typical apparatus forms before described.

FIG. 23 schematically shows a charge 500 of high and fast explosive, such e.g., as PETN with its igniter such as 442, in firing chamber 402 typifying any of the firing chambers here described. FIG. 23a is a time-pressure diagram, indicating typical time-pressure relations obtained in the firing and pressure chambers. As has been said, controlled time of pressure rise and peak pressure in the firing chamber depend on the selected nature and amount of the pressure raising reagent and the selected total area of restricted orifices such as 424. With a high and fast explosive the pressure in the firing chamber may rise in a fraction of a millisecond to a peak as high as 50,000 p.s.i.

In FIG. 23a, let the solid line A represent the pressure rise to peak and the subsequent primary pressure decay in the firing chamber. The primary decay rate or pattern in the firing chamber depends on and is selectively controlled by the controlled peak pressure and the orifice area. With any given amount of a given reagent, the decay rate and pattern are selectively controlled by the orifice area through which the firing chamber pressure is discharged into the pressure chamber.

In FIG. 23a, the dashed line B represents typical pressure rise in the pressure chamber. During the time period of pressure rise in the firing chamber, the pressure rise in the pressure chamber follows that in the firing chamber at a lower pressure controlled by the orifice area. Then, as the firing chamber pressure has its primary decay, pressure in the pressure chamber rises more slowly with a pattern that finally flattens out at a peak as the pressures in the two chambers approach equalization. The pressure in the pressure chamber thus has a dwell substantially at the peak, in the region indicated "Dwell" in the figure. The time period of that dwell depends on the selectively controlled decay pattern of the firing chamber pressure. If that decay pattern is relatively fast, the pressure chamber dwell is relatively short; if relatively slow, the pressure chamber dwell at peak is relatively long. The peak pressure in the pressure chamber at which the dwell occurs, is selectively controlled by the peak pressure in the firing chamber and the orifice restrictive area. That peak pressure is selectively controllable to be anything from a few p.s.i. up to as much as, say 10,000 p.s.i.

As typified in FIG. 23a, the secondary pressure decay, of the double decay system, in the pressure chamber, begins substantially at the point C in the diagram where the two pressures equalize. From that point on, the secondary decay, typically indicated by the dashed line D, may be of any selectively controlled pattern, controlled by heat loss from the gas body in the pressure chamber (including that in the firing chamber) modified at selection by pressure releases and/or boosting as has been described. That selectively controlled secondary decay pattern applies to all the secondary decay patterns herein mentioned.

FIGS. 24 and 24a schematically show another manner of controllably timing the dwell at peak in the pressure chamber. Here FIG. 24 represents at 502 a charge of a slow reagent such as e.g., a slow explosive such as black or smokeless powder or a relatively slow burning propellant such as X-12. Such reagents may be forming in an elongate body or string. On firing at one end, pressure in the firing chamber rises typically along the solid line A of FIG. 24a to a peak controlled primarily by the type and amount of reagent burned and the restrictive orifice area. During that period pressure in the pressure chamber, following that in the firing chamber, rises along the dashed line B to a lower peak determined by the restriction orifices. Continued burning of the reagent in the firing chamber keeps up the pressure there, and by choice of the rate of that burning to keep the pressure in the firing chamber up to supply any pressure decay in the pressure chamber, the firing chamber pressure has a dwell substantially at peak, as indicated. The pressure chamber then has a corresponding peak pressure dwell, as indicated. At the termination of the firing chamber dwell, the pressure there has its primary decay; and secondary pressure decay in the pressure chamber then takes place influenced by the primary decay, but controlled as before described. Selective control of the time period of peak dwell in the pressure chamber is thus had by selection of the pressure raising reagent and its total burning time.

FIGS. 25 and 25a show schematically a reagent combination for obtaining a controlled dwell period at the peak pressure raised in the pressure chamber by a high, fast explosive. In FIG. 25 the high explosive 500 is fired by the igniter 442 and raises the high peak pressure indicated in FIG. 25a in a matter of, say, less than a millisecond. In the same charge cartridge, separated preferably by an inert spacer 501, there is a charge of slower burning reagent 502, such, say, as black powder or a propellant. The spacer insures that the slow reagent starts burning as the fast explosive finishes, and its then continued slow burning maintains the peak dwell in the pressure chamber for a time period dependent on its time period of burning in the same manner as in FIG. 24a. FIG. 25a represents by solid line A the typical pressure pattern in the firing chamber, while dashed line B represents a typical pressure pattern in the pressure chamber.

FIGS. 25b and 25c illustrate another modification of the system of the invention, particularly applicable to such operations as metal formation or compaction. FIG. 25b schematically shows the elements of e.g., the device of FIG. 22 with its dome cover 400, base platen 406 and primary charge 440 in firing chamber 402. Primary charge 440 may be like any of those shown in FIGS. 23 to 25a. Base 406 is shown, for example, with a die formation 506 into which metal plate 505 is to be pressed and formed. In addition to what is shown in FIG. 22, this FIG. 25b shows a secondary charge 440a supported directly in the pressure chamber 426. The two charges 440 and 440a are fired in controlled sequence by e.g. timer 54a. Charge 440, fired first, raises a primary peak pressure in the firing chamber, such as indicated by the solid line A, followed by the indicated primary decay. Pressure in the pressure chamber indicated by the dashed line B has its controlled dwell at the pressure chamber peak, as in e.g. FIGS. 23a and 24a. But in addition, charge 440a, directly in the pressure chamber, is fired in such succeeding time relation to the firing of charge 440, as to raise a short and very high pressure peak in the pressure chamber at about the time the pressure along line B reaches its peak. That short, sharp high-pressure secondary peak is indicated typically by B1, followed by controlled dwell of the normal peak, as indicated.

The short and very high pressure jolt, applied to e.g., metal to be formed by the prolonged pressure dwell, is advantageous in temporarily loosening the internal molecular bond-structure of such substances as metal, making them temporarily more flexible and formable under the prolonged pressure of the dwell.

FIGS. 26 and 26a show schematically a plural combination for obtaining plural successive peaks and dwells in the firing chamber. The two charges, Nos. 1 and 2, of FIG. 26 are shown essentially like the charge of FIG. 25, each with a relatively fast explosive first fired by igniter 442, and with the slower reagent spaced by the inert spacer. FIG. 26a shows the primary time-pressure pattern in a single, or in a pair of firing chambers, produced by firing charge No. 1 first, and then, after controlled delay, firing charge No. 2. The first primary peak raised by the explosive of charge No. 1 is dwell prolonged for the desired period by its associated slow reagent. Then, on firing charge No. 2, a higher primary peak is raised by its explosive, and prolonged for the deisred dwell period by its associated slower reagent. Assuming FIG. 26a represents a typical firing chamber time-pressure pattern, the time-pressure pattern in the pressure chamber follows each rise to peak and each dwell, and with a final secondary pressure decay similar to the relations and controls described in connection with FIGS. 24a and 25a.

Timed successive firings of such charges may be had by successive electrical ignition of the igniters, as previously explained, or by timed fusing such e.g., as indicated in FIG. 27. Where several charges are successively fired it is desirable to place them in separate firing chambers. FIG. 27 shows schematically three firing tubes 180a, 180b and 180c, such for example as those of FIGS. 13–16 and 20, 21. Each firing tube may contain a string of any selected reagent, such as high explosive 24 as described in connection with FIG. 1. These may be fired successively by electric igniters 54 under control of a timer 54a, as has been explained in connection with FIG. 12. Or, as shown here, an electric igniter 54b may simultaneously ignite one end of three fuses 54c leading respectively to boosters 54d which fire the charges 24 in the three firing tubes. Assuming the three fuses 54c have the same propagation rate, then their relative lengths determine the firing sequence in firing tubes Nos. 1, 2 and 3. As indicated here, the tubes are fired in the order 1, 2, 3. FIG. 27a indicates a typical time-pressure pattern for such firing, No. 1 reaching a peak which then falls off or is partially or wholly maintained by a slow reagent such as the slow reagent indicated as propellant in each tube. Then in timed succession No. 2 is fired, followed by a succeeding pressure fall or dwell, and finally No. 3, followed by the final fall or dwell and pressure decay. Pressures in the associated pressure chamber follow these firing tube pressures in the relations described in connection with e.g. FIGS. 23 to 25a.

The completely controlled procedures herein set out including dwell period control, may be applied in any of the apparatus forms herein described. Peak dwell in the pressure chamber may, by the various controls described, be prolonged by the selectively controlled dwells for periods ranging from fractions of milliseconds up to as much as seconds. As will be set out below, peak dwell for a substantial time period is important in certain operations where inertial mass is to be moved.

FIGS. 28, 29 and 30 illustrate schematically several typical and illustrative operations that may be performed by the dynamic pressure methods here described. These operations are not limited to any particular type of apparatus here described, being shown only illustratively in connection with the apparatus of FIG. 22. Thus, in these FIGS. 28, 29 and 30, the bottom platen, 406 is shown equipped for these typical operations.

FIG. 28 illustrates in simple form a die 504 of suitable hard material set in platen 406 and having an upwardly open cavity 506 of any desired form into which a metal sheet or plate 505 is to be pressed for formation by the dynamic pressure developed in the pressure chamber of FIG. 22. A vacuum connection at 507 serves to hold the plate down into position on the die, and then the application of the dynamic pressure, preferably with a dwell a peak, to the upper face of the plate forces it into the die to form it as indicated at 505a.

Powdered metal or other powdered material may also be compacted to solids of whatever form the die may present, by placing the powder in the die to be subjected to the downwardly exerted dynamic pressure developed in the pressure chamber.

FIG. 29 illustrates schematically a shearing operation, with a hard shearing die 510 set in the platen to shear a sheet or plate 512 by application of the dynamic pressure on it. And FIG. 30 shows schematically simple arrangements for a pressure welding operation. In that figure two pieces 520 and 522 are shown as suported and held in endwise abutment in an adapter 524 set in platen 406. The upper piece 522 has its upper end exposed to the dynamic pressure raised in the pressure chamber. That pressure forces 522 down on 520 to effect a pressure weld of the two pieces.

Although maintenance of peak pressure dwell before pressure decay may be desirable in operations, such as, testing various bodies and materials under dynamic pressures, that dwell is particularly desirable in any operation where, either for test purposes or such forming, pressing, shearing or similar purposes, movement of a body, possessing any amount of inertia, is involved. That may be so where, for example, it is desired to test the reaction to prolonged pressure of such a heavy bent as shown in FIG. 1, or of a foundation or soil as in FIG. 19. And maintained peak dwell is particularly desirable, or necessary, for such operations as in FIGS. 28–30. As has been remarked, the dynamic pressure system of the invention is substantially inertia free, involving, as it does, only the dynamic pressure movement of gaseous bodies. But plates to be formed or sheared, or bodies of powder to be compacted, or metal elements to be pressure welded, may have large inertia. Maintenance of peak pressures for as long as seconds may consequently be necessary to move the masses under operation. And for certain of such operations the peak pressures may be made to be as high as say 10,000 p.s.i.

The peak pressure reached in the pressure chamber depends primarily on the type and amount of reagent used, and on the selective restriction of pressure admission from the firing chamber into the pressure chamber.

The period of dwell at the peak in the pressure chamber is fully controlled as to duration. Using a single fast explosive the dwell may be made very short. The dwell period may be increased to as much as seconds by using other reagent in such form, as in a long string, or of such slow burning characteristics that during the latter part of its burning the peak dwell is maintained, as in FIG. 24a. And the same dwell control is had by utilizing a slow burning reagent after a fast one, as in FIG. 25a. The dwell at, or substantially at peak pressure is thus completely selectively controlled as to time period. It may be anything from a fraction of a millisecond up to seconds.

At the end of the controlled peak dwell period, whatever its time duration, controlled pressure decay immediately starts, completely controlled as to both time period and pressure-time pattern by heat loss modified by the pressure releases or boostings previously described.

The whole pressure-time pattern of the dynamic pressure wave is thus selectively controlled, to be, e.g. similar to the dynamic pressure-time pattern of an atomic shock wave, or the pressure-time pattern best suited for operating on an inertia body for moving it under pressure.

I claim:
1. The herein described method of applying reproducible dynamic pressure loads to a subject; said method comprising the steps of
firing a selected chemically reactive charge and thereby creating a body of gas in a firing chamber as selectively controlled relatively high pressure and temperature within a time period of pressure rise substantially that of a predetermined time period of controlled pressure rise on the subject,
controllably and restrictedly admitting hot pressure gas from the firing chamber into a pressure-holding-and-load-applying chamber to controllably produce in that chamber a charge of heated gas at a controlled peak pressure after said predetermined and controlled time period of pressure rise,
maintaining said charge of heated gas in the pressure-holding-and-load-applying chamber substantially at said peak pressure for a controlled selected time period of peak pressure dwell, allowing pressure decay, in the pressure-holding-and-load-applying-chamber, from the controlled termination of the dwell at peak pressure, controlled at least in part by heat loss from the body of gas in that chamber, and applying the load of said rising and maintained and decaying gas pressure to the subject in said last mentioned chamber.

2. The herein described method of applying reproducible dynamic pressure loads to a subject; said method comprising the steps of firing a selected chemically reactive charge and thereby creating a body of gas in a firing chamber at relatively high temperature and at a selectively controlled peak pressure not less than a predetermined peak pressure to be applied to the subject, said peak pressure being followed by a period of pressure decay controlled at least in part by the following stated release of gas from the firing chamber, controllably and restrictedly releasing hot pressure gas from the firing chamber into a pressure-holding-and-load-applying chamber to controllably produce in that chamber a charge of heated gas at a controlled peak pressure after a predetermined and controlled time of pressure rise, maintaining said charge of heated gas in the pressure-holding-and-load-applying chamber substantially at said peak pressure for a controlled selected time period of peak pressure dwell, allowing pressure decay, in the pressure-holding-and-load-applying chamber, from the controlled termination of the dwell at peak pressure, controlled at least in part by heat loss from the body of gas in that chamber, and applying the load of said rising and maintained and decaying gas pressure to the subject in said last mentioned chamber.

3. The method defined in claim 2 and including the additional step of modifying the pressure in the pressure-holding-and-load-applying chamber, during pressure decay therein, independently of said pressure decay by heat loss, and in selectively timed relation to the period of pressure dwell.

4. The method defined in claim 2 and wherein the time period of pressure decay from its peak in the firing chamber is selectively controlled, with any given selected charge in the firing chamber, by selectively and restrictedly controlling the release of gas from the firing chamber to the pressure-holding-and-load-applying chamber, whereby the peak pressure reached in the latter chamber is below that reached in the firing chamber, and whereby the time period of dwell at peak pressure in the pressure-holding-and-load-applying-chamber is selectively controlled by the rate of pressure decay in the firing chamber.

5. The method defined in claim 2 and wherein the selected reactive charge fired in the firing chamber is a relatively slow reacting composition with a relatively long period of reaction, whereby the peak pressure raised in the firing chamber is maintained for a selectively controlled time period of dwell, and whereby the time period of pressure dwell in the pressure-holding-and-load-applying-chamber is selectively controlled by the controlled release of gas from the firing chamber to the pressure-holding-and-load-applying chamber during the pressure dwell in the firing chamber.

6. The method defined in claim 5 and including the additional step of modifying the pressure in the pressure-holding-and-load-applying chamber, during pressure decay therein, independently of said pressure decay by heat loss, and in selectively timed relation to the period of pressure dwell.

7. The method defined in claim 2 and wherein the chemically reactive charge fired in the firing chamber is of relatively slow and relatively long continued reaction, the controlled and restricted release of hot pressure gas from the firing into the pressure-holding-and-load-applying chamber being of such gas passing capacity as to make the rest of said release substantially equal to the rate of heated pressure gas production in the firing chamber before the termination of reaction in the firing chamber, and thereby producing a pressure dwell in the firing chamber and a co-terminous pressure dwell in the pressure-holding-and-load-applying chamber during the later part of reaction in the firing chamber.

8. The method defined in claim 2, and including the selectively timed successive firings of multiple charges in the firing chamber, a selected relatively fast and powerful reagent being first fired to raise a relatively high peak pressure in the firing chamber followed by a controlled period of pressure decay therein, and a selected relatively slow reacting reagent then being fired during said period of pressure decay thereby to create and maintain a selectively controlled period of pressure dwell in that chamber, and whereby the pressure in the pressure-holding-and-load-applying-chamber is maintained at substantially peak pressure dwell co-terminously with the pressure dwell in the firing chamber.

9. The method defined in claim 8 and including the additional step of modifying the pressure in the pressure-holding-and-load-applying-chamber, during pressure decay therein, independently of said pressure decay by heat loss, and in selectively timed relation to the period of pressure dwell in said last mentioned chamber.

10. The herein described method of applying reproducible multiple dynamic loads to a subject; said method comprising the steps of successively firing multiple selected chemically reactive charges in a firing chamber in controlled time sequence and thereby generating bodies of gas at controlled sequential temperatures and pressures in the firing chamber, controllingly and restrictedly admitting hot pressure-gas from the firing chamber into a pressure-holding-and-load-applying-chamber to produce in that chamber charges of gas at successive controlled peak pressures after controlled times of pressure rises, successively allowing the successive pressures in the last mentioned chamber to controllably decay from their respective peak pressures controlled at least in part by heat loss from said charges, and applying said successive pressure rises and decays to the subject in said last mentioned chamber.

11. The herein described method of applying reproducible multiple dynamic loads to a subject; said method comprising the steps of successively firing multiple selected chemically reactive charges in respectively multiple firing chambers in controlled time sequence and thereby generating bodies of gas at relatively high temperatures and pressures in the several firing chambers, controllingly and restrictedly admitting hot pressure-gases from the several firing chambers into a pressure-holding-and-load-applying chamber to produce in that chamber charges of gas at successive controlled peak pressures after controlled times of pressure rises, successively allowing the successive pressures in said last mentioned chamber to controllably decay from their respective peak pressures controlled at least in part by heat loss from said charges, and applying said successive pressure rises and decays to the subject in said last mentioned chamber.

12. The herein described method of applying reproducible dynamic loads to a plurality of subjects; said method comprising the steps of successively firing multiple selected chemically reactive charges in respectively multiple firing chambers in controlled time relation and thereby generating bodies of gas at relatively high controlled temperatures and pressures in the several firing chambers, controllingly and restrictedly admitting hot pressure-gases from the several firing chambers respectively to multiple corresponding pressure-holding-and-load-applying-chambers, and applying the pressures of said last mentioned chambers respectively to one or more of the several subjects.

13. System for dynamic loading of a subject comprising in combination, a walled firing chamber containing a chemically reactive charge adapted on firing to produce therein a body of gas at relatively high pressure and temperature, a normally closed pressure holding and subject receiving chamber spacedly surrounding the firing chamber, and selectively restricted passage means leading through the walls of the firing chamber from the interior of the firing chamber to the interior of the said pressure holding chamber to controllably and restrictedly admit hot pressure gas from the firing chamber to the pressure holding chamber.

14. The combination defined in claim 13 and in which the firing chamber is bodily removable from the pressure holding chamber.

15. The combination defined in claim 13 and including also reverberation suppressing baffles in the pressure holding chamber and surrounding the firing chamber.

16. System for dynamic loading of a subject comprising in combination, a walled firing chamber containing a chemically reactive charge adapted on firing to produce therein a body of gas at a relatively high pressure and temperature, a normally closed pressure holding and subject receiving chamber, and selectively restricted passage means leading through the walls of the firing chamber from the interior of the firing chamber to the interior of the said pressure holding chamber to controllably and restrictedly admit hot pressure gas from the firing chamber to the pressure holding chamber.

17. System for dynamic loading of a subject, comprising in combination a walled firing chamber containing a chemically reactive charge adapted on firing to produce therein a body of gas at relatively high pressure and temperature, actuable means for firing said charge, a normally closed pressure-holding and subject receiving chamber spacedly surrounding the firing chamber, selectively restricted passage means leading through the walls of the firing chamber from the interior of the firing chamber to the interior of the pressure holding chamber to controllably admit hot pressure gas to the pressure holding chamber, means adapted on actuation to modify the pressure in said pressure holding chamber independently of said gas admission from the firing chamber, and independently of heat loss from the gas in said pressure holding chamber, to selectively determine the pattern of pressure decay in said pressure holding chamber, and means to automatically actuate said last mentioned means in timed relation to the actuation of said firing means.

18. The combination defined in claim 17 and in which, said pressure modifying means includes valve means for relieving pressure from the subject taking chamber, and including means for actuating the firing means, and means for causing the relief valve means to open in predetermined time sequence with the actuation of the firing means.

19. The combination defined in claim 17 and in which, the pressure modifying means includes means for injecting pressure gas into the subject taking chamber, and including means for actuating the firing means, and means for actuating the pressure gas injection means in predetermined time sequence with the actuation of the firing means.

20. The combination defined in claim 16, wherein the normally closed pressure holding and subject taking chamber is composed of a pressure holding chamber surrounding the firing chamber, and a walled extension subject-taking cell communicating with the pressure holding chamber and adapted to take a subject between its walls.

21. The combination defined in claim 16 and also including spaced walls depending from the pressure holding chamber and enclosing two opposite lateral sides of a subject-taking cell in pressure communication with the pressure holding chamber, and movable means for supporting a subject in said cell between said walls and for closing the space between said walls at the ends of the subject.

22. The combination as defined in claim 16, and in which the subject-taking and pressure holding chamber has a peripherally surrounding wall with an open mouth surrounded by that wall, said open mouth adapted to be applied to a subject.

23. The combination defined in claim 36 and in which, the open mouth of the subject-taking and pressure holding chamber is formed by a hollow piston slidable through a wall of said chamber.

24. The combination defined in claim 16 and in which, the pressure holding chamber is cylindric and has a head at one end and is open at its opposite end, a cylindric hollow piston having one end in, and being slidable in, the pressure holding chamber, said piston having a head at its end in said chamber and an opposite open end adapted to protrude from said chamber and to be applied to a subject, said firing chamber being in restricted communication with the interior of the piston through selectively restricted passage means, said firing chamber containing a chemically relative charge adapted on firing to produce therein a body of gas at relatively high pressure and temperature, and communication between the interior of the piston and the pressure holding chamber between the two heads.

25. The combination defined in claim 24 and including means for applying a pressure fluid to the pressure holding chamber between the two heads.

26. The combination defined in claim 16 and in which, the normally closed pressure holding chamber is formed by a base and a hollow walled member having an open mouth applicable to the base to form the normally closed chamber, releasable means for securing said hollow walled member to the base, the firing chamber being in restricted communication with the interior of the hollow walled member, the base being recessed and adapted to take subject holding mandrels.

27. The combination defined in claim 16 and in which, the normally closed pressure holding chamber is walled by a subject supporting base and a hollow walled member removable from and having an open mouth applicable to the base to enclose the normally closed chamber, and releasable means for securing said hollow walled member to the base to form the normally closed chamber.

28. The combination defined in claim 16 and in which, the normally closed pressure holding chamber is walled by a relatively stationary subject supporting base and a relatively movable hollow walled member removable from and having an open mouth applicable to the base to enclose the normally closed chamber, and releasable means for securing said hollow walled member to the base to form the normally closed chamber.

29. System for multiple dynamic loadings of a plurality of subjects, including the combination defined in claim 16 and in which the normally closed pressure holding chamber is adapted to surround a plurality of subjects and with which said firing chamber is in restricted communication, and including another walled pressure-holding chamber attached to the wall of the first pressure-holding chamber and having an open mouth adapted to be applied to one of the subjects, and a second firing chamber in restricted communication with said second mentioned pressure-holding chamber through selectively restricted passage means, each of said two firing chambers containing a chemically reactive charge adapted on firing to produce therein a body of gas at relatively high pressure and temperature.

30. The combination defined in claim 29, and in which, the second mentioned pressure-holding chamber is located within the first mentioned pressure-holding chamber.

31. The combination defined in claim 29, and in which, the open mouth of the second mentioned pressure-holding chamber is formed by a hollow piston slidable through the wall of said chamber.

32. The combination defined in claim 16 and also including a hollow tubular piston slidable through one wall of the normally closed pressure holding chamber and adapted to have its outer end applied to the subject.

References Cited by the Examiner

UNITED STATES PATENTS

| | | | |
|---|---|---|---|
| 1,444,947 | 2/1923 | Candee. | |
| 2,390,635 | 12/1945 | Barker et al. | 102—39 X |
| 2,877,709 | 3/1959 | Duckworth | 102—39 |
| 2,917,927 | 12/1959 | Clark | 73—432 |
| 2,943,673 | 7/1960 | Hickman | 102—39 X |
| 2,977,787 | 4/1961 | Holcomb | 73—12 |
| 3,044,430 | 7/1962 | Zeigler | 113—44 |
| 3,065,720 | 11/1962 | Rardin. | |
| 3,066,486 | 12/1962 | Kirschner et al. | 60—39.47 X |
| 3,136,049 | 6/1964 | Throner et al. | 113—44 X |

DAVID SCHONBERG, *Primary Examiner.*

RICHARD C. QUEISSER, LOUIS R. PRINCE,
*Examiners.*

ERNEST F. KARLSEN, DAVID B. DEIOMA,
*Assistant Examiners.*